(12) United States Patent　(10) Patent No.: US 8,767,517 B2
Suzuki et al.　(45) Date of Patent: Jul. 1, 2014

(54) LIBRARY DEVICE WITH READS AND WRITES DATA FROM AND TO A HOUSED RECORDING MEDIA

(75) Inventors: Takeshi Suzuki, Tokyo (JP); Shinichi Sudou, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 0 days.

(21) Appl. No.: 13/636,586

(22) PCT Filed: Mar. 3, 2011

(86) PCT No.: PCT/JP2011/054994
§ 371 (c)(1),
(2), (4) Date: Sep. 21, 2012

(87) PCT Pub. No.: WO2011/118362
PCT Pub. Date: Sep. 29, 2011

(65) Prior Publication Data
US 2013/0010581 A1　Jan. 10, 2013

(30) Foreign Application Priority Data

Mar. 24, 2010　(JP) ................................. 2010-068052

(51) Int. Cl.
*G11B 33/04*　(2006.01)
(52) U.S. Cl.
USPC ...................................................... 369/75.11
(58) Field of Classification Search
CPC . G11B 15/6835; G11B 33/127; G11B 33/123
USPC ................. 360/92.1; 369/30.32, 30.38, 75.11
See application file for complete search history.

(56) References Cited

U.S. PATENT DOCUMENTS 5,303,214 A * 4/1994 Kulakowski et al. ......... 369/30.3
5,357,495 A * 10/1994 Solhjell ........................ 369/30.3
(Continued)

FOREIGN PATENT DOCUMENTS

JP　1-169998 A　7/1989
JP　2008-217938 A　9/2008
WO　2009/041375 A1　4/2009

OTHER PUBLICATIONS

International Search Report for PCT/JP2011/054994 dated May 31, 2011.

*Primary Examiner* — Angel Castro
(74) *Attorney, Agent, or Firm* — Sughrue Mion, PLLC

(57) ABSTRACT

Disclosed is a library device in which the space to enlarge the magazine can be secured to the rear side of the library device. The library device includes power supply means for supplying electricity to the library device, medium housing means which can house a plurality of computer-readable media, medium reading/writing means for reading/writing data from/to the medium, medium conveying means for conveying the medium between the medium housing means and the medium reading/writing means, control means for controlling operation of the library device and first connection means to which the power supply means and the control means can be electrically connected when these means are installed and from which the power supply means and the control means can be disconnected when these means are extracted. The power supply means, the first connection means, and the control means are disposed along any one of two sides of the library device, and one of the first connection means is disposed between the power supply means and the control means and whereby, the first connection means is connected to the power supply means and the control means.

10 Claims, 3 Drawing Sheets

(56) References Cited

U.S. PATENT DOCUMENTS

| | | | |
|---|---|---|---|
| 5,669,749 A * | 9/1997 | Danielson et al. | 414/280 |
| 5,703,843 A * | 12/1997 | Katsuyama et al. | 369/30.33 |
| 5,905,698 A * | 5/1999 | Iwamura et al. | 369/30.32 |
| 6,163,431 A * | 12/2000 | Fleckenstein et al. | 360/92.1 |
| 6,731,455 B2 * | 5/2004 | Kulakowski et al. | 360/92.1 |
| 7,522,373 B2 * | 4/2009 | Goodman et al. | 360/92.1 |
| 7,551,392 B2 * | 6/2009 | Schultz | 360/92.1 |
| 2010/0200524 A1 | 8/2010 | Suzuki et al. | |

* cited by examiner

LIBRARY DEVICE WITH READS AND WRITES DATA FROM AND TO A HOUSED RECORDING MEDIA

CROSS REFERENCE TO RELATED APPLICATIONS

This application is a National Stage of International Application No. PCT/JP2011/054994 filed Mar. 3, 2011, claiming priority based on Japanese Patent Application No. 2010-068052 filed Mar. 24, 2010, the contents of all of which are incorporated herein by reference in their entirety.

TECHNICAL FIELD

The present invention relates to a library device which houses a plurality of computer-readable recording media and reads/writes data from/to the housed recording media.

BACKGROUND ART

The patent document 1 discloses an example of the library device which houses a plurality of computer-readable recording media and reads/writes data from/to the housed recording media. FIG. 3 shows an example of the structure of the library device related to the present invention that is shown in this patent document 1. FIG. 3 is a plan view (top view) of the library device, viewed from the upper side.

In the library device shown in FIG. 3, a drive device 1, a control device 2, and a power supply device 3 that are electrically connected via a backboard 4 are disposed at the rear side. These devices 1 to 3 are directly connected to the backboard 4 and can be installed from the rear side of the library device. In FIG. 3, each of the devices 1 to 3 can be removed in an arrow direction shown in FIG. 3. The control device 1 is connected to one backboard 4 but the drive device 1 and the power supply device 3 share one backboard 4.

In the library device shown in FIG. 3, a magazine 6 is mounted at the left side and the right side (a first side and a second side) of the library device. The magazine 6 has a plurality of cells (portions separated by a dashed line in FIG. 3) and each cell houses one medium 7 (for example, a cartridge in which a magnetic tape is packed). These media can be attached to and detached from the magazine 6 and the magazine 6 can be attached to and detached from the library device. The magazine 6 can be installed from the front side of the library device.

In the library device shown in FIG. 3, an accessor mechanism 5 is disposed between two magazines 6. The accessor mechanism 5 can be moved between two magazines 6 from the front side to the rear side or from the rear side to the front side of the library device (in the arrow direction shown in FIG. 3). For example, when an instruction for reading/writing data from/to a specific medium is generated, the accessor mechanism 5 conveys the specific medium. Namely, the accessor mechanism 5 removes the designated medium 7 from the magazine 6 according to the instruction from the control device 2, conveys it to the drive device 1, and inserts it in a slot 10. When the data of the medium 7 has been read or written, the accessor mechanism 5 removes the medium 7 from the drive device 1, conveys it to the predetermined magazine 6 in which the medium has to be housed, and inserts it in the predetermined cell in which the medium has to be housed.

PRIOR ART DOCUMENT

Patent Document

Patent document 1: Japanese Patent Application Laid-Open No. 2008-217938

BRIEF SUMMARY OF THE INVENTION

Problems to be Solved by the Invention

However, in the structure of the library device shown in FIG. 3, the drive device 1, the control device 2, and the power supply device 3 are disposed along the rear side of the library device. Two backboards 4 used for these three devices are disposed. Therefore, there is no space at the rear side of the library device. When there is no space at the rear side, the following problem occurs.

First, the length of the magazine 6 in the depth direction (the direction from the front side to the rear side) of the library device is limited. In an example shown in FIG. 3, the length of the magazine 6 is approximately half of the depth direction length of the library device. Therefore, the magazine having the depth direction length that is longer than this length cannot be used as the magazine 6 of the library device. In other words, because the length of the magazine 6 is limited, a problem in which the number of the media 7 which can be housed in the library device is limited and whereby, the number of the media 7 which can be housed cannot be increased occurs.

A range of movement of the accessor mechanism 5 in the depth direction of the library device is also limited. In the example shown in FIG. 3, the range of movement of the accessor mechanism 5 is approximately half of the depth direction length of the library device.

Therefore, the accessor mechanism 5 cannot be moved in the rear side direction beyond the range of movement. Namely, because the range of movement of the accessor mechanism 5 is limited, the accessor mechanism 5 cannot be moved to the rear side. For this reason, the magazine device having such structure has a problem in which even when a deep cell system in which the range of movement from the front side to the rear side is required is adopted, the number of the media cannot be increased. Here, the deep cell system is a system in which a plurality of media are housed in one cell of the magazine.

The present invention is made in view of the above-mentioned situation. An object of the present invention is to provide a library device in which the space to enlarge the magazine can be secured to the rear side.

Means for Solving the Problems

To realize the object, a library device of the present invention characterized by includes:
power supply means for supplying electricity to the library device;
medium housing means which can house a plurality of computer-readable media;
medium reading/writing means for reading/writing data from/to the medium;
medium conveying means for conveying the medium between the medium housing means and the medium reading/writing means;

control means for controlling operation of the library device; and first connection means to which the power supply means and the control means can be electrically connected when these means are installed and from which the power supply means and the control means can be disconnected when these means are extracted, wherein the power supply means, the first connection means, and the control means are disposed along any one of two sides of the library device, and one of the first connection means is disposed between the power supply means and the control means and whereby, the first connection means is connected to the power supply means and the control means.

Effect of the Invention

According to the present invention, the library device in which the space to enlarge the magazine can be secured to the rear side of the library device can be provided.

MODE FOR CARRYING OUT THE INVENTION

Figure 1:
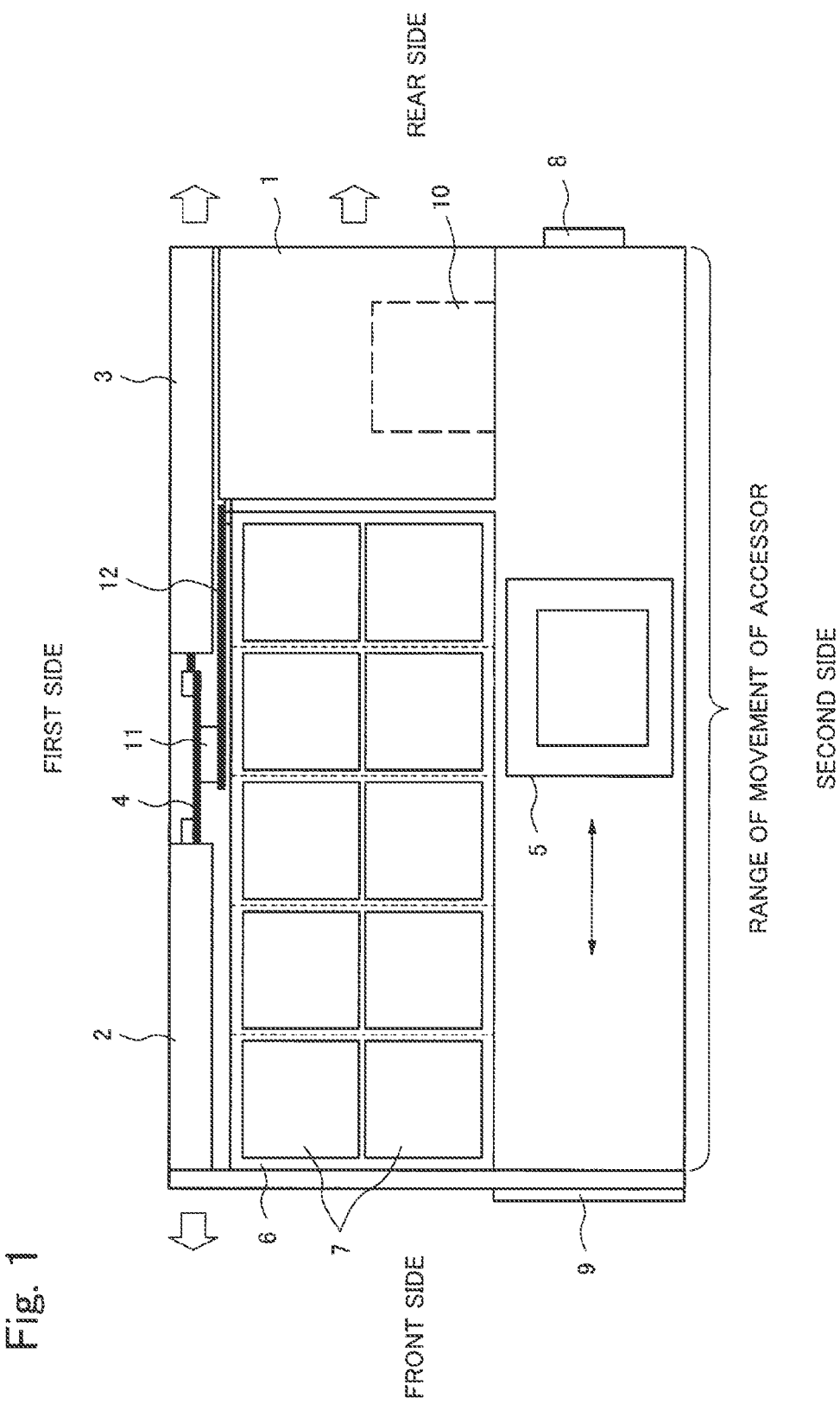
FIG. 1 is a top view showing an example of structure of a library device according to an exemplary embodiment of the present invention.
Figure 2:
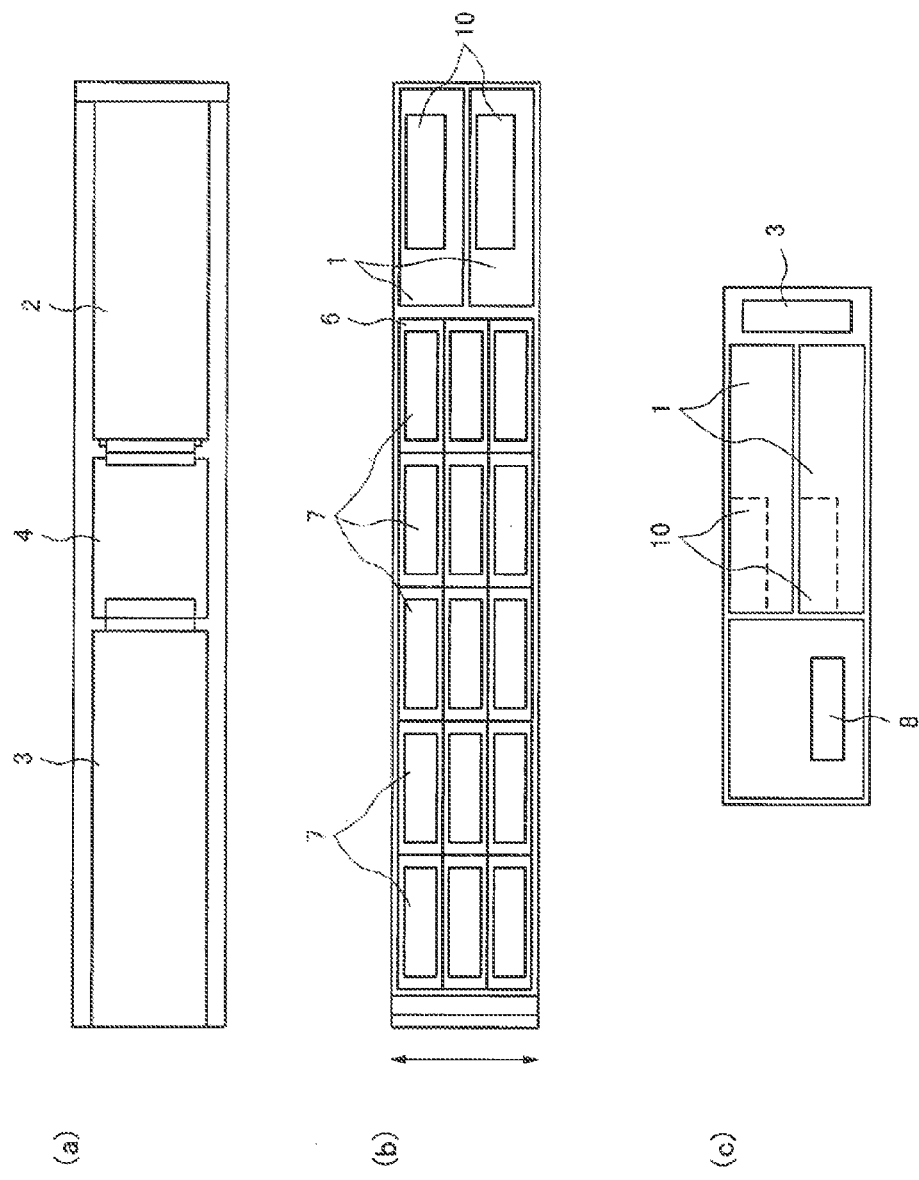
FIG. 2 are side views and a rear view showing an example of structure of a library device according to an exemplary embodiment of the present invention.

A mode (exemplary embodiment) for carrying out the present invention will be described in detail below with reference to the accompanying drawing. FIG. 1 is a plan view (top view) showing a library device according to an exemplary embodiment of the present invention, viewed from an upper side. FIG. 2 shows figures showing a library device according to an exemplary embodiment of the present invention, viewed from side and rear. Namely, FIG. 2(a) shows a library device viewed from a first side shown in FIG. 1. FIG. 2(b) shows a library device viewed from a second side shown in FIG. 1. FIG. 2(c) shows a library device viewed from a rear side shown in FIG. 1. Further, in FIG. 2(b), the accessor mechanism 5 is not shown.

The library device of the exemplary embodiment comprises the drive device 1, the control device 2, the power supply device 3, the backboard 4, the accessor mechanism 5, the magazine 6, the medium 7, a LAN connector 8, and a front panel 9.

The magazine 6 is an example of medium housing means. The magazine 6 has a plurality of cells (portions separated by a dashed line in FIG. 1) and each cell houses two media 7. Namely, in the exemplary embodiment, the deep cell system is adopted. In the exemplary embodiment, as shown in FIG. 2(b), the magazine 6 has fifteen deep cells (the magazine has three rows in a vertical direction and each row has five deep cells in the depth direction of the library device). The magazine 6 can be attached to and detached from the library device. The magazine 6 can be installed from the front side of the library device.

The medium 7 is a computer-readable recording medium. The medium 7 is for example, a cartridge in which a magnetic tape is packed. This medium 7 can be attached to and detached from the magazine 6.

The accessor mechanism 5 is one example of medium conveying means. This accessor mechanism 5 can be moved from the front side to the rear side or from the rear side to the front side (movement in the depth direction of the library device (namely, movement in both directions indicated by the arrow shown in FIG. 1)). The accessor mechanism 5 can be moved between the front edge and the rear edge in the depth direction of the library device as shown in FIG. 1. The accessor mechanism 5 can be moved from the upper side to the lower side or from the lower side to the upper side (movement in the vertical direction of the library device (namely, movement in both directions indicated by the arrow shown in FIG. 2(b))). The accessor mechanism 5 can be moved between the top face and the bottom face of the library device in the vertical direction of the library device. For example, when an instruction for reading/writing data from/to a specific medium is generated, the accessor mechanism 5 conveys the specific medium. Namely, the accessor mechanism 5 removes the designated medium 7 from the magazine 6 according to the instruction from the control device 2 and conveys it to the drive device 1. After that, the accessor mechanism 5 inserts the designated medium 7 in the slot 10. When the data of the medium 7 has been read or written, the accessor mechanism 5 removes the medium 7 from the slot 10 of the drive device 1, conveys it to the magazine 6 in which the medium has to be housed, and inserts it in the predetermined cell in which the medium has to be housed. In the deep cell system, when the designated medium 7 is housed in the deep side of the cell, the medium housed in the front side of the cell has to be temporarily moved to the vacant cell as an evacuation operation. The accessor mechanism 5 also performs such evacuation operation.

The drive device 1 is an example of medium reading/writing means. This drive device 1 reads/writes the data from/to the medium 7 inserted in the slot 10. In the exemplary embodiment, as shown in FIG. 2(b) and FIG. 2(c), two drive devices 1 are arranged one above the other.

The control device 2 is an example of control means. This control device 2 controls the operation of the library device. For example, when a user's instruction to read data in the medium 7 is received, the control device 2 controls the accessor mechanism 5 so as to convey the medium 7 and the drive device 1 so as to read data in the conveyed medium 7.

The power supply device 3 is an example of power supply means. This power supply device 3 supplies electricity to drive the library device.

The backboard 4 is an example of first connection means. This backboard 4 is a connector for electrically connecting the devices in the library device to each other. The control device 2 and the power supply device 3 are directly connected to the backboard 4 when these devices are installed on the backboard 4 and the connection between them can be released when the devices are extracted from the backboard 4. On the other hand, the LAN connector 8 and the front panel 9 described later are connected to the backboard 4 via a cable. Because the accessor mechanism 5 is connected to the front panel 9 by the cable, as a result, the accessor mechanism 5 is connected to the backboard 4 via the front panel 9. The backboard 4 is electrically connected to a backboard 12 described later via a connector 11.

The backboard 12 is an example of second connecting means. This backboard 12 is a connector for electrically connecting the devices in the library device to each other. The drive device 1 is directly connected to the backboard 12 when the drive device 1 is installed on the backboard 12 and the connection between them can be released when the drive device 1 is extracted from the backboard 12. The backboard 12 is electrically connected to the backboard 4 mentioned above via the connector 11. In this exemplary embodiment, although two backboards, the backboard 4 and the backboard 12, are used, two backboards may be integrated as one backboard.

The LAN connector 8 is a connector which can connect the library device to the local area network.

The front panel 9 receives user's various operations and displays various information.

As shown in FIG. 1 and FIG. 2(a), in the library device of the exemplary embodiment, the control device 2 and the power supply device 3 are disposed along the first side in two sides. The backboard 4 is disposed between the control device 2 and the power supply device 3. The backboard 4 is disposed at approximately center of the library device in the depth direction.

As shown in FIG. 1, the magazine 6 is mounted and the drive device 1 is disposed at an adjoining section of the control device 2, the backboard 4, and the power supply device 3 that are disposed along the first side. The backboard 12 is disposed between the magazine 6 and the power supply device 3/the backboard 4. The backboard 12 and the backboard 4 are disposed so that both backboards are adjacent to each other and disposed in parallel and both backboards are electrically connected to each other via the connector 11.

The drive device 1 is disposed so that the rear of the drive device 1 is adjacent to the power supply device 3. Namely, the drive device 1 is disposed so that a gateway (insert-and-remove-opening) for the medium 7 of the slot 10 faces the second side. The magazine 6 is also mounted so that the gateway (insert-and-remove-opening) for the medium 7 of each deep cell faces the second side. The gateway for the medium 7 of the slot 10 and the gateway for the medium 7 of each deep cell are disposed in parallel.

As shown in FIG. 1, the accessor mechanism 5 is disposed at the second side. A space (a space in the depth direction of the library device) in which the accessor mechanism 5 is moved is provided along the second side. The gateway for the medium 7 of the slot 10 and the gateway for the medium 7 of each deep cell face this space. The accessor mechanism 5 inserts/removes the medium 7 in/from the gateway.

In FIG. 1, the control device 2 and the power supply device 3 are electrically connected to the backboard 4. The control device 2 and the power supply device 3 can be attached to and detached from (inserted in and extracted from) the backboard 4 and directly connected to the backboard 4. The control device 1 is connected to the backboard 4 by installing the control device 1 from the front side of the library device. The connected control device 1 can be extracted in the front direction (the direction of the arrow shown in FIG. 1). The connection is released by this. The power supply device 3 is connected to the backboard 4 by installing the power supply device 3 on the backboard 4 from the rear side of the library device. The connected power supply device 3 can be extracted in the rear direction (the direction of the arrow shown in FIG. 1). The connection is released by this.

In FIG. 1, the drive device 1 is electrically connected to the backboard 12. The drive device 1 can be attached to and detached from (inserted in and extracted from) the backboard 12 and directly connected to the backboard 12. The drive device 1 is connected to the backboard 12 by installing the drive device 1 on the backboard 12 from the rear side of the library device. The connected drive device 1 can be extracted in the rear direction (the direction of the arrow shown in FIG. 1). The connection is released by this.

In this exemplary embodiment, although the control device 2 and the power supply device 3 are disposed along the first side, these devices may be disposed along the second side. In the exemplary embodiment, the control device 2 is disposed at the front side and the power supply device 3 is disposed at the rear side. However, the power supply device 3 may be disposed at the front side and the control device 2 may be disposed at the rear side.

As described above, this exemplary embodiment is characterized by having a structure in which the control device 2 and the power supply device 3 are disposed along the side of the library device although conventionally, the control device 2 and the power supply device 3 are disposed at the rear side of the library device, the backboard 4 shared by the control device 2 and the power supply device 3 is provided, and the backboard 4 is disposed between the control device 2 and the power supply device 3. By using this structure, the space to enlarge the magazine can be secured in the depth direction of the library device in comparison with the conventional structure (for example, FIG. 3). Therefore, because the length of the housed magazine can be increased, the number of the housed media can be increased. Because the accessor mechanism can be moved from the front edge to the rear edge, the number of the housed media can be increased by adopting the deep cell system.

Figure 3:
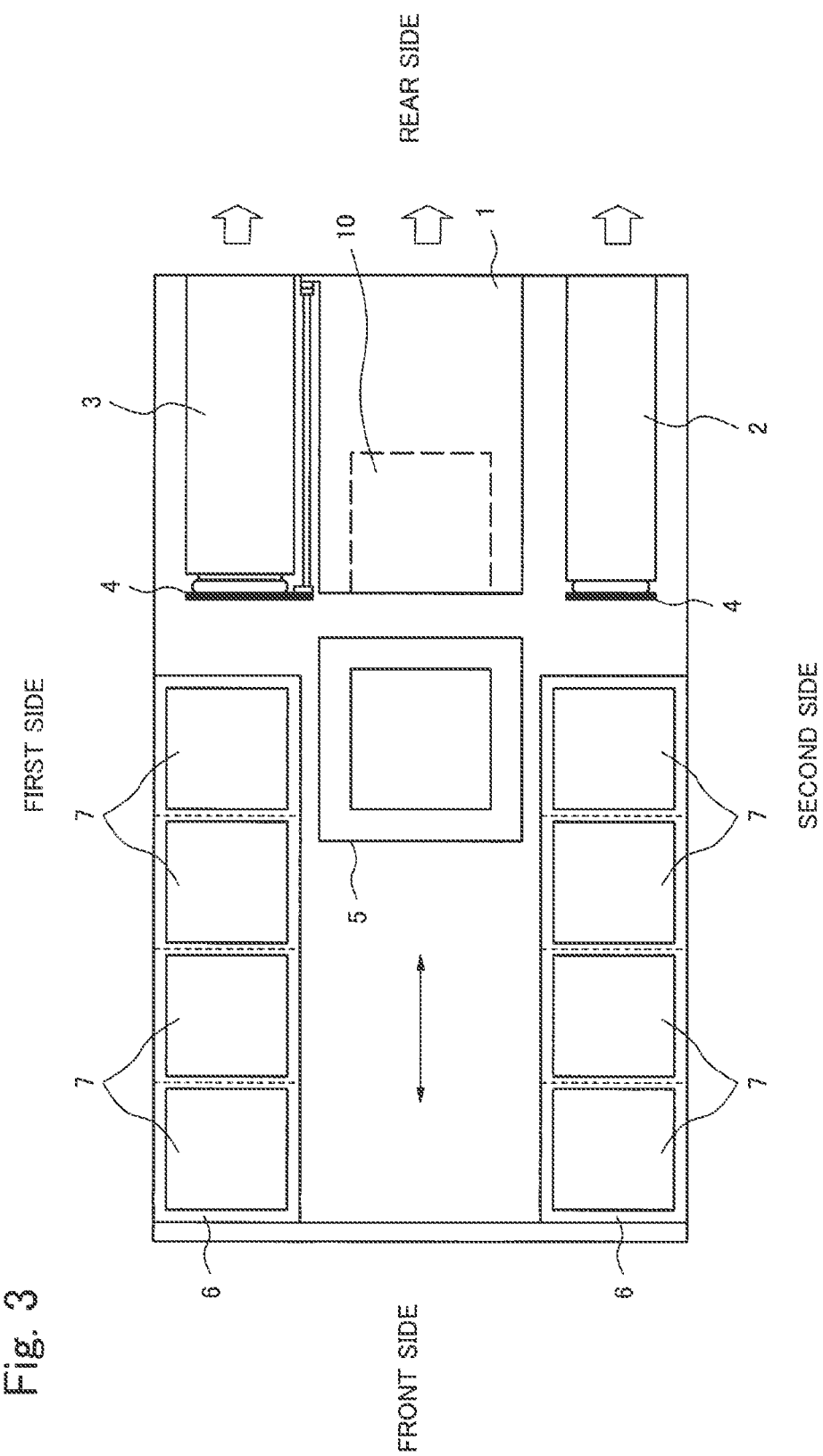
FIG. 3 is a top view showing an example of structure of a library device related to the present invention.

In the structure shown in FIG. 3, a plurality of backboards are separately disposed. Therefore, a cable for connecting the backboards is required. In contrast, in the exemplary embodiment, because a plurality of backboards are provided so that the backboards are adjacently disposed, such cable is not required.

In the exemplary embodiment, because the device housed in the library device can be installed from the front side or the rear side of the library device, the convenience of maintenance is improved.

The invention of the present application has been described above with reference to the exemplary embodiment. However, the invention of the present application is not limited to the above-mentioned exemplary embodiment. Various changes in configuration and details of the invention of the present application which can be understood by the person skilled in the art can be made without departing from the scope of the invention of the present application.

This application claims priority from Japanese Patent Application No. 2010-068052 filed on Mar. 24th, 2010, the disclosure of which is hereby incorporated by reference in its entirety.

DESCRIPTION OF SYMBOL 1 drive device
2 control device
3 power supply device
4 backboard
5 accessor mechanism
6 magazine
7 medium
8 LAN connector
9 front panel
10 slot
11 connector
12 backboard

The invention claimed is:
1. A library device, comprising:
a power supply device to supply electricity to the library device;
a medium housing device which can house a plurality of computer-readable media;

a medium reading/writing device to reading/writing data from/to the medium;

a medium conveying mechanism to convey the medium between the medium housing device and the medium reading/writing device;

a control device to control operation of the library device;

a first connection device to which the power supply device and the control device can be electrically connected when these devices are installed and from which the power supply device and the control device can be disconnected when these devices are extracted and a second connection device to which the medium reading/writing device can be electrically connected when the medium reading/writing device is installed, from which the medium reading/writing device can be disconnected when the medium reading/writing device is extracted, and which is electrically connected to the first connection device, wherein the power supply device, the first connection device, and the control device are disposed along any one of two sides of the library device, and one of the first connection device is disposed between the power supply device and the control device and whereby, the first connection device is connected to the power supply device and the control device.

2. The library device according to claim 1, wherein the control device is installed on the first connection device from a front side of the library device and extracted from it.

3. The library device according to claim 1, wherein the power supply device is installed on the first connection device from a rear side of the library device and extracted from it.

4. The library device according to claim 1, wherein the medium reading/writing device is installed on the second connection device from the rear side of the library device and extracted from the second connection device.

5. The library device according to claim 1, wherein a space in which the medium conveying mechanism can be moved from a front edge to a rear edge of the library device is formed at one side that faces the other side at which the power supply device, the first connection device, and the control device are disposed.

6. The library device according to claim 5, wherein a gateway for the medium of the medium reading/writing device and a gateway for the medium of the medium housing device are disposed so that the gateways are adjacently disposed and face the space and a deep cell system in which a plurality of media can be housed in one cell is adopted for the medium housing device.

7. A library device, comprising:

a power supply device to supply electricity to the library device;

a medium housing device which can house a plurality of computer-readable media;

a medium reading/writing device to reading/writing data from/to the medium;

a medium conveying mechanism to convey the medium between the medium housing device and the medium reading/writing device;

a control device to control operation of the library device; and a first connection device to which the power supply device and the control device can be electrically connected when these devices are installed and from which the power supply device and the control device can be disconnected when these devices are extracted, wherein the power supply device, the first connection device, and the control device s are disposed along any one of two sides of the library device, one of the first connection device is disposed between the power supply device and the control device and whereby, the first connection device is connected to the power supply device and the control device and a space in which the medium conveying mechanism can be moved from a front edge to a rear edge of the library device is formed at one side that faces the other side at which the power supply device, the first connection device, and the control device are disposed.

8. The library device according to claim 7, wherein the control device is installed on the first connection device from a front side of the library device and extracted from it.

9. The library device according to claim 7, wherein the power supply device is installed on the first connection device from a rear side of the library device and extracted from it.

10. The library device according to claim 7, wherein a gateway for the medium of the medium reading/writing device and a gateway for the medium of the medium housing device are disposed so that the gateways are adjacently disposed and face the space and a deep cell system in which a plurality of media can be housed in one cell is adopted for the medium housing device.

* * * * *

UNITED STATES PATENT AND TRADEMARK OFFICE
CERTIFICATE OF CORRECTION

PATENT NO. : 8,767,517 B2  
APPLICATION NO. : 13/636586  
DATED : July 1, 2014  
INVENTOR(S) : Takeshi Suzuki and Shinichi Sudou Page 1 of 1

It is certified that error appears in the above-identified patent and that said Letters Patent is hereby corrected as shown below:

On the Title Page, Item (54) and in the Specification, Column 1, line 1, Title

Delete "WITH" and insert -- WHICH --

Signed and Sealed this  
Seventeenth Day of February, 2015

Michelle K. Lee  
*Deputy Director of the United States Patent and Trademark Office*